G. TURKE.
AUTOMOBILE JACK AND TURNING DEVICE.
APPLICATION FILED MAR. 20, 1915.
1,176,792. Patented Mar. 28, 1916.
3 SHEETS—SHEET 2.
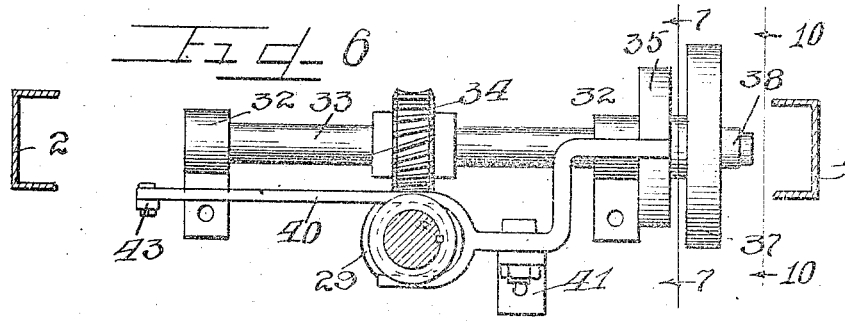
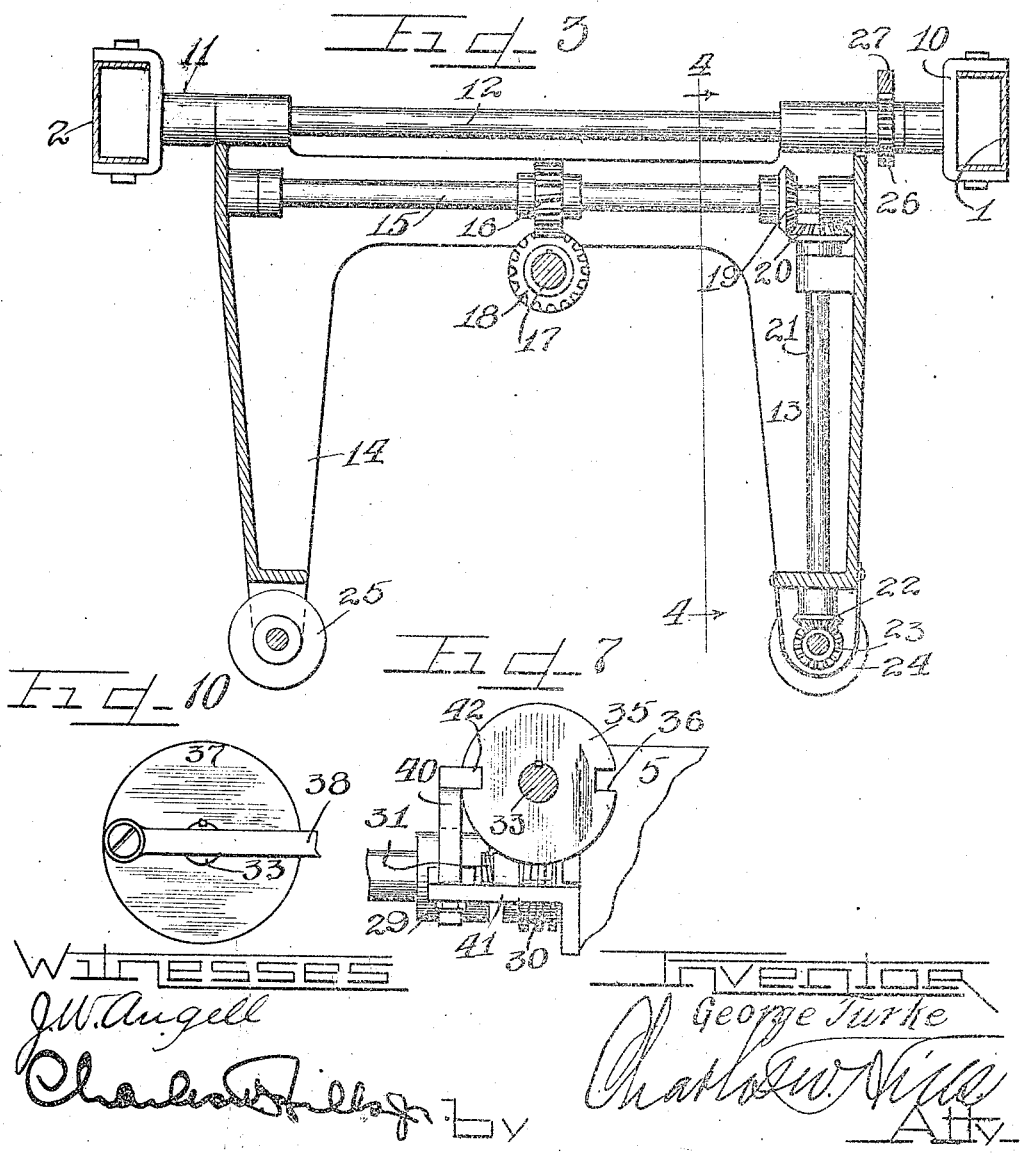

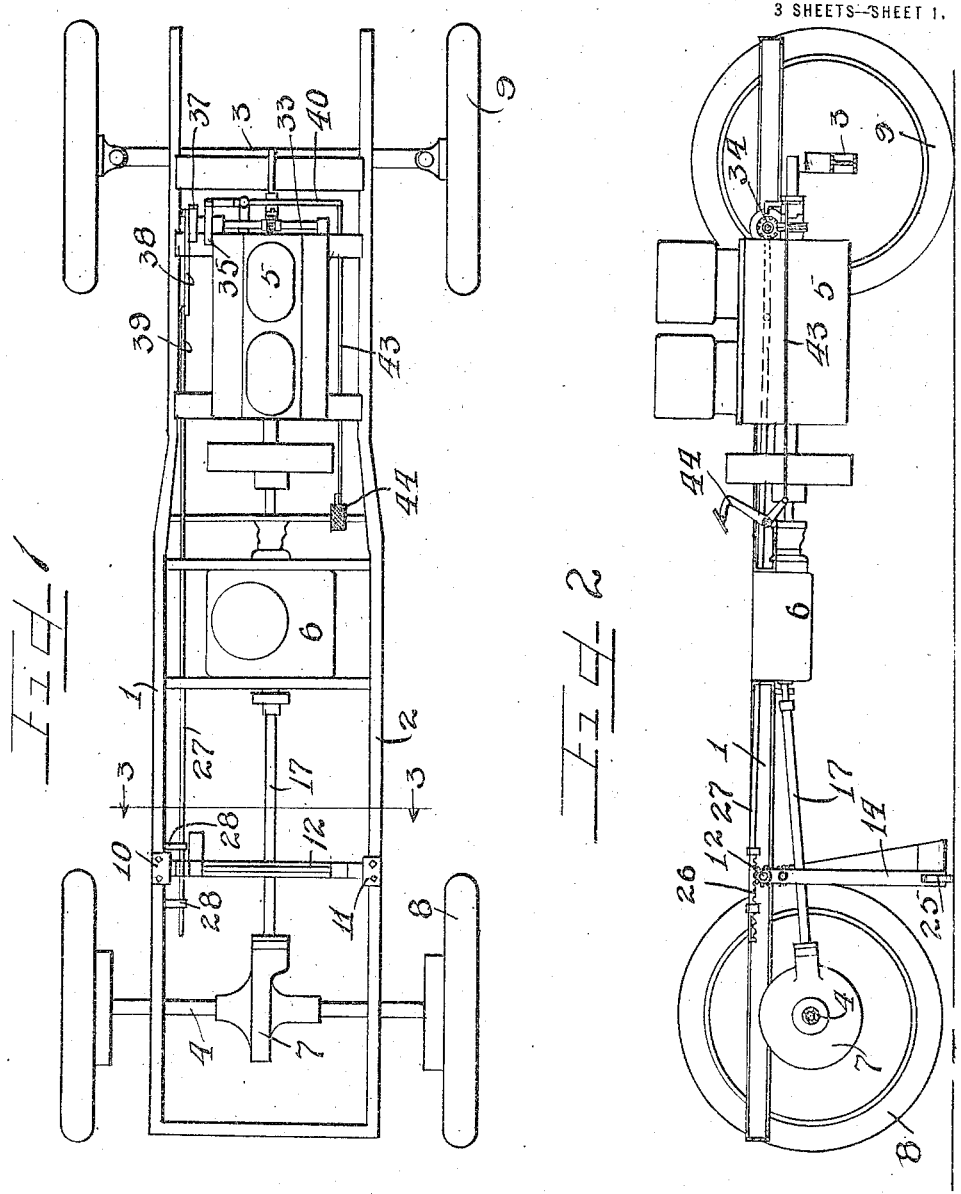

G. TURKE.
AUTOMOBILE JACK AND TURNING DEVICE.
APPLICATION FILED MAR. 20, 1915.
1,176,792.
Patented Mar. 28, 1916.
3 SHEETS—SHEET 3.
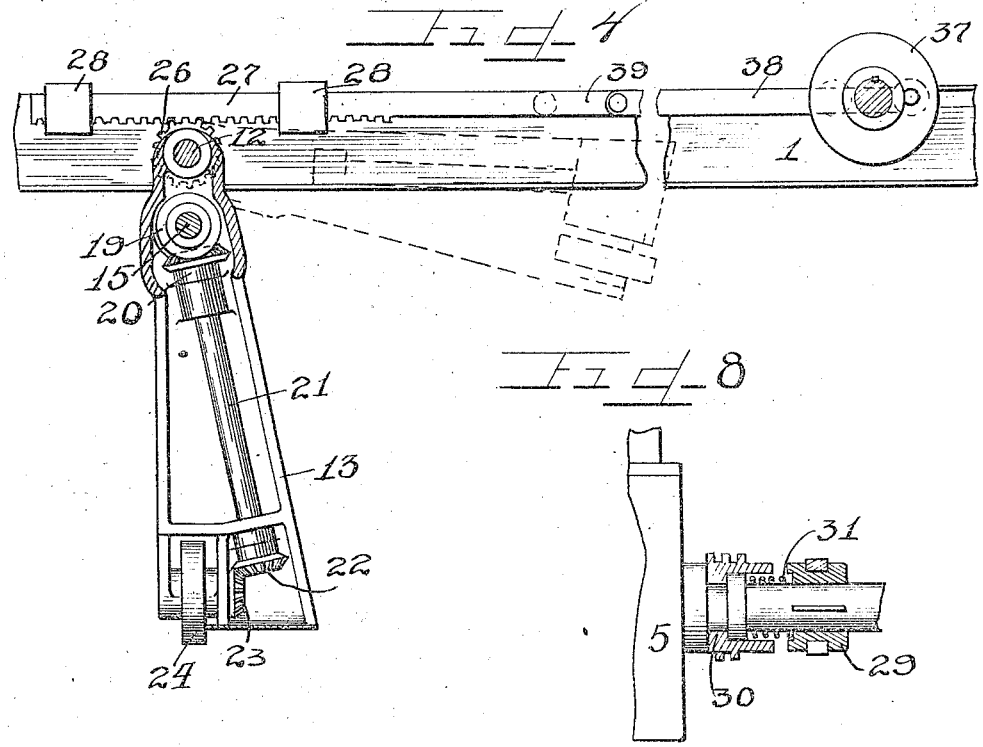
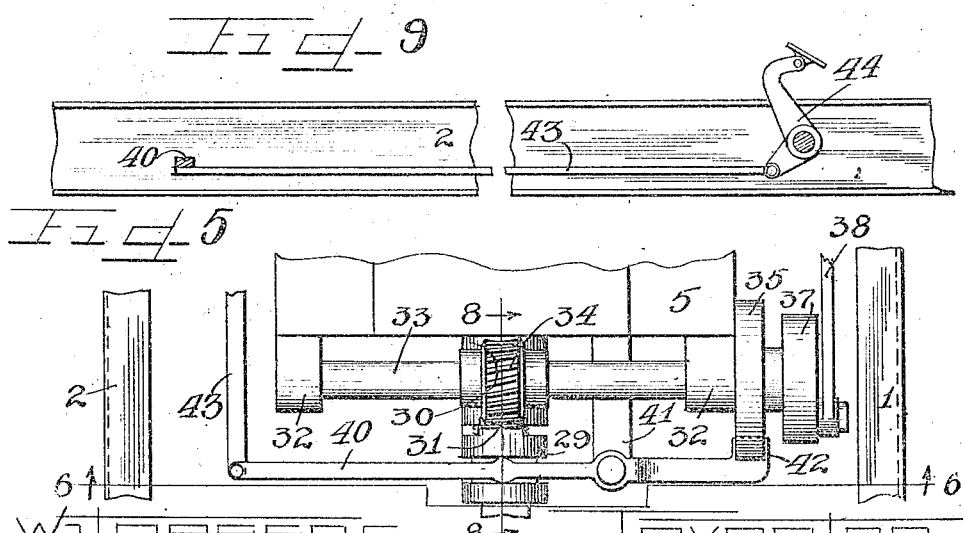

UNITED STATES PATENT OFFICE.

GEORGE TURKE, OF HINSDALE, ILLINOIS, ASSIGNOR OF ONE-THIRD TO ALEXANDER LASLO, OF HINSDALE, ILLINOIS.

AUTOMOBILE JACK AND TURNING DEVICE.

1,176,792. Specification of Letters Patent. Patented Mar. 28, 1916.

Application filed March 20, 1915. Serial No. 15,723.

*To all whom it may concern:*

Be it known that I, GEORGE TURKE, a subject of Emperor Francis Joseph of Austria-Hungary, and a resident of the town of Hinsdale, in the county of Dupage and State of Illinois, and whose post-office address is Post-Office Box 456, Hinsdale, Illinois, have invented certain new and useful Improvements in Automobile Jacks and Turning Devices; and I do hereby declare that the following is a full, clear, and exact description of the same, reference being had to the accompanying drawings, and to the numerals of reference marked thereon, which form a part of this specification.

This invention relates to an apparatus adapted to be associated with an automobile, particularly trucks, whereby the rear wheels of the truck may be elevated from the ground as for instance when in a garage, in order to permit turning or shifting of the vehicle within a small radius. The apparatus acts not only as a jack to support the vehicle, with the rear driving wheels free of the ground, but is also connected with the power plant to move the vehicle, shifting the same within a confined area.

My invention involves the use of mechanisms of comparatively simple construction readily adapting the device to be associated with practically any type of motor vehicle, either at the time the vehicle is built, or subsequently thereto.

It is an object of this invention to construct an elevating and turning gear for motor vehicles normally carried in a position out of use and adapted to be moved into a position for use by the power of the vehicle, and thereafter operated to turn the vehicle within a confined area.

It is also an important object of this invention to construct an automobile elevating and shifting mechanism at all times associated with the automobile and normally in a position out of use, adapted to be positively moved into operating position by a drive from the power plant of the automobile and thereafter acting to support and shift the automobile with the wheels elevated from the ground in various directions, utilizing the power plant of the automobile for the purpose.

It is a further object of this invention to provide a motor vehicle with a supplementary pair of wheels journaled transversely of the vehicle and normally in a position out of use, but adapted to be positively moved into operating position to elevate the rear wheels of the vehicle from the ground and thereafter move the vehicle in a confined area, while supported upon said supplementary wheels.

It is finally an object of this invention to construct a simple type of power driven supplementary supporting means for motor vehicles for elevating and moving the same in a confined area.

The invention (in a preferred form) is illustrated in the drawings and hereinafter more fully described.

In the drawings: Figure 1 is a conventional top plan view of the chassis of a motor vehicle equipped with a device embodying the principles of my invention. Fig. 2 is a side elevation thereof with parts broken away and shown in section illustrating the device in position for use. Fig. 3 is a fragmentary detail section taken on line 3—3 of Fig. 1. Fig. 4 is a fragmentary detail section taken on line 4—4 of Fig. 3. Fig. 5 is a fragmentary enlarged detail plan view at the forward end of the vehicle, illustrating the driving connections for my invention. Fig. 6 is a detail section taken on line 6—6 of Fig. 5, with parts shown in elevation. Fig. 7 is a detail section taken on line 7—7 of Fig. 6. Fig. 8 is a detail section taken on line 8—8 of Fig. 5. Fig. 9 is a fragmentary detail view, illustrating the connection between the operating foot lever and the clutch engaging lever of the device. Fig. 10 is a fragmentary detail view taken on line 10—10 of Fig. 6.

As shown in the drawings: The chassis of the automobile consists of side sills 1 and 2, supported in a usual manner upon a front axle 3, and a rear axle 4, with a motor 5, of any suitable type mounted at the forward end of the chassis and connected to drive the rear wheels through a transmission 6, and differential 7. The rear wheels are denoted by the reference numeral 8, and are suitably connected upon the rear axle 4, and the front wheels are denoted by the reference numeral 9, being mounted upon the front axle 3.

Rigidly bolted to the side sills 1 and 2, of the chassis are bearing brackets 10 and 11, respectively, in which is journaled a transverse shaft 12. Rigidly secured upon said transverse shaft 12, is a U-shaped frame having legs 13 and 14, respectively, and journaled within said U-frame in bearings provided on opposite sides thereof near the point of attachment to the shaft 12, is a shaft 15, having secured centrally thereon a helical gear 16. The driving shaft of the automobile extending between the transmission 6, and differential 7, is denoted by the reference numeral 17, and at a point intermediate its ends is provided with a helical gear 18, which, for certain positions of the U-frame 13—14, meshes with the helical gear 16. At one end of said shaft 16, a bevel pinion 19, is secured which meshes with a bevel pinion 20, secured on the upper end of a shaft 21, which is journaled on the leg 13, of the U-frame. The lower end of said shaft 21, is provided with a bevel pinion 22, which meshes with a bevel pinion 23, which is in turn rigidly connected to a roller or supporting wheel 24, journaled at the lower end of the leg 13. Another similar roller or wheel 25, is journaled at the lower end of the leg 14, although in the latter case no driving connections therefor are provided. When the aforesaid transverse shaft 12, is rotated the U-frame and the mechanisms associated therewith is moved into various positions, one extreme position of which is shown in dotted lines in Fig. 4, and the other extreme position or that in which the device is in position for use, being shown in full lines in said figure. For the purpose of rotating said transverse shaft 12, and thus manipulating the U-frame into the desired position, a pinion 26, is secured upon said shaft and meshes with a slidable rack 27, mounted along the chassis sill member 1, and movable through brackets 28, provided therefor. A power driven mechanism is provided for actuating the rack 27, and for this purpose a clutch member 29, is feathered upon the forward end of the crank shaft of the engine and is adapted to be thrown into interlocking engagement with a clutch worm 30, rotatable on the crank shaft, with a coiled spring 31, disposed between said clutch members acting normally to maintain the clutch member 29, in disengaged position.

Journaled in bearing members 32, at the front of the engine 5, is a cross shaft 33, provided with a worm wheel 34, meshing with said worm 30, and at one of its ends having secured thereon a disk 35, having notches 36, therein, and beyond which another disk 37, is secure, with a connecting rod 38, connected eccentrically thereto. Said connecting rod 38, is in turn pivoted to a link 39, which is connected to the forward end of the rack bar 27. A clutch lever 40, for said clutch member 29, is pivoted on an extension 41, at the forward end of the engine, and at one end is provided with a tooth 42, adapted to engage in the notches 36, of the disk 35. At its other end said clutch lever 40, is connected to an actuating bar or lever 43, which extends rearwardly of the chassis and is connected to a bell crank foot pedal lever 44.

The operation is as follows: The auxiliary mechanism on the motor vehicle is normally carried in the position illustrated in dotted lines in Fig. 4. However, when the vehicle has been driven into a garage or is positioned in any confined space where it is necessary to shift the same and the steering radius is insufficient to ordinarily accomplish the same, the operator depresses the pedal lever 44, thereby shifting the clutch lever 40, to move the clutch element 29, into engagement with the worm 30. Such movement of the clutch lever 40, causes the tooth 42, to be withdrawn from the notch 36, in the disk 35, which, of course, begins to rotate, and the clutch lever 40, is thus held by contact with said tooth 42, on the periphery of the disk 35, in such position as to maintain the clutch engaged. Of course, the gear wheel 34, being driven by the worm and causing rotation of the shaft 33, and disk 35, also rotates the disk 37, which is rigid on said shaft. The movement of the disk 37, is transmitted through the connecting rod and link to the rack bar 27, thus rotating the small pinion 26, in a direction to lower the U-frame beneath the vehicle, finally moving the same into a position therebeneath to hold the vehicle elevated from the ground. When this extreme position of the U-frame has been reached one of the notches 36, in the disk 35, will have passed around into a position to allow the tooth 42, on the clutch lever 40, to engage therein, thus permitting the clutch member 29, to be thrown out of engagement under the impulse of the spring 31, to disconnect the drive from the adjusting means of the U-frame.

With the vehicle supported upon the supplementary wheels 24 and 25, the transmission gears may be shifted to drive the rear wheels 8, which, being out of contact with the ground, results only in rotation of the driving shaft 17. The helical gear 18, on said driving shaft 17, having been meshed with the gear 16, on the U-frame when said U-frame was lowered into position for use, acts to drive the latter helical gear and consequently the shafts 15 and 21, resulting in a drive being communicated to the supplementary supporting wheel or roller 24. Thus the supplementary gear may be used to shift the rear end of the vehicle, with the forward end thereof pivoting on the front wheels. Of course, by throwing in the reverse gear in the transmission 6, the drive shaft 17, may be caused to rotate in an opposite direction to thus shift the machine upon its supplementary supporting gear in another direction. When it is desired to retract the supplementary gear into position out of use the clutch pedal 44, is depressed, thus entraining the proper mechanism to cause rotation of the disk 37, and the connecting rod 38, attached thereto will be moved in a direction to actuate the rack bar 27, and actually move the entire chassis rearwardly, the same rolling on the front wheels and being supported upon the supplementary rollers 24 and 25. As the chassis moves rearwardly, the rollers 24 and 25, however, maintaining a fixed position, the rear wheels 8, finally are lowered into contact with the ground, whereupon the continued movement of the rack bar acts to elevate the supplementary gear into a position out of use.

I am aware that various details of construction may be varied through a wide range without departing from the principles of this invention, and I therefore do not purpose limiting the patent granted otherwise than necessitated by the prior art.

I claim as my invention:

1. In a device of the class described, the combination with an automobile, of a supplementary frame connected thereto and adapted to be adjusted to support the automobile with the drive wheels out of contact with the ground, connections with the engine of the automobile for operating said frame, and rollers mounted on said frame and driven from the main drive shaft of the automobile when clutched to the automobile drive wheels.

2. In a device of the class described, the combination with an automobile, of supplementary wheels for supporting the same with the driving wheels of the automobile out of contact with the ground, an adjustable frame on which said supplementary wheels are mounted, and connections for said supplementary wheels and frame whereby said frame may be adjusted by the engine and said supplementary wheels driven from the main drive shaft of the automobile when clutched to the automobile drive wheels.

3. In a device of the class described, the combination with an automobile, of an adjustable wheel carrying frame mounted near one end thereof, a foot treadle, means operated by said treadle for communicating the engine power to said frame to move its wheels into contact with the ground to elevate that end of the automobile, said means automatically disconnecting from the engine power upon the completion of said movement, and said means adapted, upon a further depression of said treadle, to return said frame to its initial position.

4. In a device of the class described, the combination with an automobile, of an adjustable wheel carrying frame pivotally mounted near one end thereof, a pinion on said pivot connected with said frame, a rack in mesh with said pinion, a foot treadle, means operated by said treadle for communicating the engine power to said rack, whereby said frame will be rotated through said pinion to a position with its wheels in contact with the ground to elevate that end of the automobile, means automatically disconnecting said engine power from said rack upon the completion of said movement, and said intermediate driving means adapted, upon a further depression of said treadle, to operate said rack to return said frame to its initial position.

5. In a device of the class described, the combination with an automobile, of an adjustable wheel carrying frame pivotally mounted near one end thereof, a pinion on said pivot connected with said frame, a rack in mesh with said pinion, a foot treadle, a disk to which said rack is eccentrically connected, a clutch operated by said foot treadle for connecting said disk with the engine drive shaft, whereby a half rotation of said disk will operate said rack to rotate said frame to move its wheels into contact with the ground to elevate that end of the automobile, and means automatically disconnecting the engine power from said disk upon the completion of said movement, said disk when again connected with the engine power through another depression of said treadle, upon a further half rotation, returning said rack to its initial position and thereby also returning said frame to its inactive position.

In testimony whereof I have hereunto subscribed by name in the presence of two subscribing witnesses.

GEORGE TURKE.

Witnesses:
 CHARLES W. HILLS, Jr.,
 FRANK K. HUDSON.